United States Patent [19]

Wise

[11] Patent Number: 5,642,898

[45] Date of Patent: Jul. 1, 1997

[54] TOOL CART

[76] Inventor: Robert W. Wise, 365 Bly Rd., Petaluma, Calif. 94954

[21] Appl. No.: 500,680

[22] Filed: Jul. 11, 1995

[51] Int. Cl.$^6$ ........................................... B62B 1/12
[52] U.S. Cl. ................... 280/652; 280/47.19; 280/47.2; 280/79.11
[58] Field of Search ................... 280/47.19, 47.24, 280/47.33, 47.131, 47.17, 47.18, 47.26, 629, 652, 763.1, 30, 79.11, 840, 37; 206/372, 373; 312/249.8, 319, 319.9

[56] References Cited

U.S. PATENT DOCUMENTS

| D. 252,197 | 6/1979 | Gale . | |
|---|---|---|---|
| 4,230,329 | 10/1980 | Johnson . | |
| 4,373,761 | 2/1983 | Hansberry, Jr. | 312/250 |
| 4,483,573 | 11/1984 | Keller . | |
| 4,955,941 | 9/1990 | Rousseau . | |
| 4,976,450 | 12/1990 | Ellefson | 280/79.11 |
| 5,005,847 | 4/1991 | King et al. | 280/47.19 |
| 5,161,590 | 11/1992 | Otto . | |
| 5,193,598 | 3/1993 | Estrem . | |
| 5,224,531 | 7/1993 | Blohm | 144/285 |
| 5,231,905 | 8/1993 | Trahan . | |
| 5,255,724 | 10/1993 | Butke . | |
| 5,269,545 | 12/1993 | Huebschen | 280/47.35 |
| 5,423,561 | 6/1995 | Sadow | 280/37 |

FOREIGN PATENT DOCUMENTS

| 1577810 | 8/1969 | France . |
|---|---|---|
| 427500 | 4/1926 | Germany . |
| 1245939 | 9/1971 | United Kingdom . |
| 2048754 | 12/1980 | United Kingdom . |
| 2069915 | 9/1981 | United Kingdom . |

OTHER PUBLICATIONS

Rousseau SS2850 Miter Saw Stand Brochure.

*Primary Examiner*—Brian L. Johnson
*Assistant Examiner*—Bridget Avery
*Attorney, Agent, or Firm*—Richard C. Litman

[57] ABSTRACT

A tool cart designed and configured to receive a number of diverse accessories. The steel frame of the tool cart is fully machined and has a powder coating. Numerous pre-existing holes in the frame allow the consumer to select a wide number of accessories for the cart. This permits the consumer to adapt the cart to fit his specialized needs. The tool cart also includes a bolted on tool box for storing and securing tools and a power strip for providing electricity to the various accessories. Wing extensions increase the ease of use (eg. in cutting work pieces) and by securing the accessories in the cart or locking the tools in the tool box, the tool cart of the present invention will eliminate tool loss, wasted time and increase efficiency.

5 Claims, 4 Drawing Sheets

TOOL CART

BACKGROUND OF THE INVENTION

1. Field of the Invention

The present invention relates to mobile tool carts. More specifically the present invention relates to mobile tool carts having pre-set holes arranged to receive a variety of accessories.

2. Description of the Prior Art

For handymen from the home-do-it-your-selfer to the construction type worker, having a way to transport and store needed tools and machinery can be a time and energy consuming endeavor. Often tools or equipment at a work site become lost or stolen. In addition, there are normally no convenient work surfaces on location. Workers today use tool carts of one form or another. The disadvantages of these carts are that there is no way to easily and adequately secure various accessories to the cart, the wheels are not sturdy enough to carry large loads and traverse rough terrain, they do not have vibration dampening devices along with levelers and they do not have easily removable bolted on tool boxes. These are just a few of the disadvantages and short-comings of the tool carts of today.

There is therefore a need for a tool cart that has prepositioned holes for receiving machined accessories, has sturdy wheels and a vibration dampening device, incorporates a removable tool box, contains a power strip that provides electricity for the accessories, has extensionable wings, and has a sturdy steel frame. The present invention provides such a device.

Tool carts have been described in the patent literature. For instance, U.S. Pat. No. 4,955,941, issued Sep. 11, 1990, to Rousseau, describes a support table for a bench saw. U.S. Pat. No. 4,230,329, issued Oct. 28, 1980, to Johnson, describes a mobile cart. U.S. Pat. No. 5,161,590, issued Nov. 10, 1992, to Otto describes a miter saw table apparatus. U.S. Pat. No. 5,255,724, issued Oct. 26, 1993, to Butke, describes an adjustable extension assembly. The brochure showing the Rousseau SS2850 discloses a mobile miter saw stand. None, of the above-list tool carts disclose a mobile tool cart having pre-drilled holes for receiving machined accessories, a leveler to compensate for uneven surfaces, a detachable tool box and a vibration dampening device.

U.S. Pat. Nos. 4,483,573, issued Nov. 20, 1984, to Keller, 5,193,598, issued Mar. 16, 1993, to Estrem, 5,231,905, issued Aug. 3, 1993, to Trahan, and U.S. Pat. No. Des. 252,197, issued Jun. 26, 1979, to Gale show work holders or stands. The above referenced patents do not teach or suggest a mobile tool cart in combination with pre-drilled holes for receiving machined accessories, a leveler and vibration dampening device, a detachable tool box, a power strip and extendable wings.

None of the above inventions and patents, taken either singly or in combination, is seen to describe the instant invention as claimed.

SUMMARY OF THE INVENTION

The present invention relates to a mobile tool cart having pre-drilled holes dimensioned and configured to receive machined accessories. Fasteners or bolts secure the accessories to the tool cart frame. A wide range of accessories or equipment may be secured to the cart including miter or table saws, tool boxes, compression engines, and vacuum cleaner type devices. The consumer simply locates the accessory on the master sheet (provided with the mobile tool cart) to determine which of the pre-drilled holes to use. This allows the consumer to quickly and accurately attach accessories to the tool cart.

The ability to select individual accessories to secure to the cart gives the consumer freedom in customizing the cart to fit his precise requirements. The tool cart incorporates sturdy wheels, a vibration dampening device and a leveler that aids in mobility and stability of use. A bolted on tool box helps store tools while preventing theft and a power strip provides electricity for the various accessories. The mobile tool cart also has means to releasably support a bench saw or the like.

For ease of transportation, the sturdy wheels assist in traveling over rough ground. To move the cart, the user tilts the cart, lifting the forward end off the ground, and then pushes the cart. The cart is designed so that when in this position, the weight is balanced on the sturdy wheels. This allows a single user to move a heavy loaded cart. The leveler is positioned near the forward part of the cart to level the cart when on a sloping surface.

Located at the bottom of the steel frame is the vibration dampening device. The device uses a spring system to reduce the amount of vibration transmitted through the frame.

The wing members are extendable to provide more space to place work items upon. This reduces the amount of time and effort spent trying to support the work items during operation of the equipment. The reduction in time spent and energy expended increases the overall efficiency. Efficiency is also increased through the use of a power strip which provides electricity to the accessories and the use of a detachable tool box bolted to the frame.

A more specific explanation of the invention and its universal characteristics follows. The tool cart is designed and configured to receive a variety and number of diverse accessories. The welded, tubular steel frame of the tool cart is fully machined with pre-engineered penetrations (e.g., tapped or through holes), and has a powder coating. The numerous pre-engineered holes in the frame allow the consumer to select a wide range of accessories for the cart. This allows the consumer to adapt the cart to fit his or her specialized needs. Heavy duty, hand truck wheels are provided on one end of the cart for ease of transporting the consumer's customized tools with accessories over rough terrain and uneven and unlevel floors. The other end of the cart has a leveler device, to accommodate an uneven support surface for the cart. Steel and/or plastic wing assemblies with support brackets create a solid work surface for use. Extensions for the wing assemblies are available, to extend the length of the work surface for work with extended length or oversize materials. Safety and efficiency are primary considerations of this tool cart and all of the available accessories. Many consumers, for example, do not use power tools on a regular basis; therefore, a safe, stable, efficient and well laid out tool cart (or bench, with the wings in the up position) is a primary characteristic of the instant invention. Another primary consideration is strength, the cart being designed to handle daily use and even abuse without failing. Accessories such as pre-engineered tool boxes, electrical boxes with multiple strip outlets, additional plug-in receptacles, integrated cords with plug ends, shelving for battery chargers and the like, electrical cord reel and/or spool brackets, dust collectors with attachments, anti-vibration compressor mounts, telescoping light stands, brackets for name brand mitre, metal, tile, table and arm saws, generator brackets, divided, small compartments for miscellaneous small parts as might be used by video-stereocellular phone installers, electricians, door hardware installers, carpenters, plumbers and home owners, brackets for plumbers' pipe threaders, a flip down wheel for level floor transporting, lifts for ease of loading the tool cart with equipment and accessories into or onto trucks or vans, dust-weather covers, a slide scale for quick and accurate cuts, various snap and/or bolt-in, clamp down devices on the wings for stabilizing work pieces, a dustbin and drawer for table sawdust removal, and bracketry, compartments and the like for gardening tools, flats and other accessories—these are just some examples of the universality of the instant tool cart invention.

Thus, the invention provides a base unit tool cart that, combined with each individual user's accessory, tool and equipment needs, can be modified to suit each individual need, with pre-engineered accessories that are complete and ready to be attached directly to the base unit, so that the user does not have to spend time figuring out how to attach any particular piece of equipment to the unit.

Accordingly, it is a principal object of the invention to provide a tool cart having pre-drilled holes capable of receiving machined accessories.

It is another object of the invention to provide a tool cart having a vibration dampening device.

It is a further object of the invention to provide a tool cart having sturdy wheels for transportation.

Still another object of the invention is to provide a tool cart having a leveler to ensure level cutting surfaces.

An additional object of the invention is to provide a tool cart having extendable rotatable wing members for placing work items upon.

It is again an object of the invention to provide a tool cart having a power strip for supplying electricity to the accessories.

Yet another object of the invention is to provide a tool cart having a fully machined steel frame with a powder coating.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
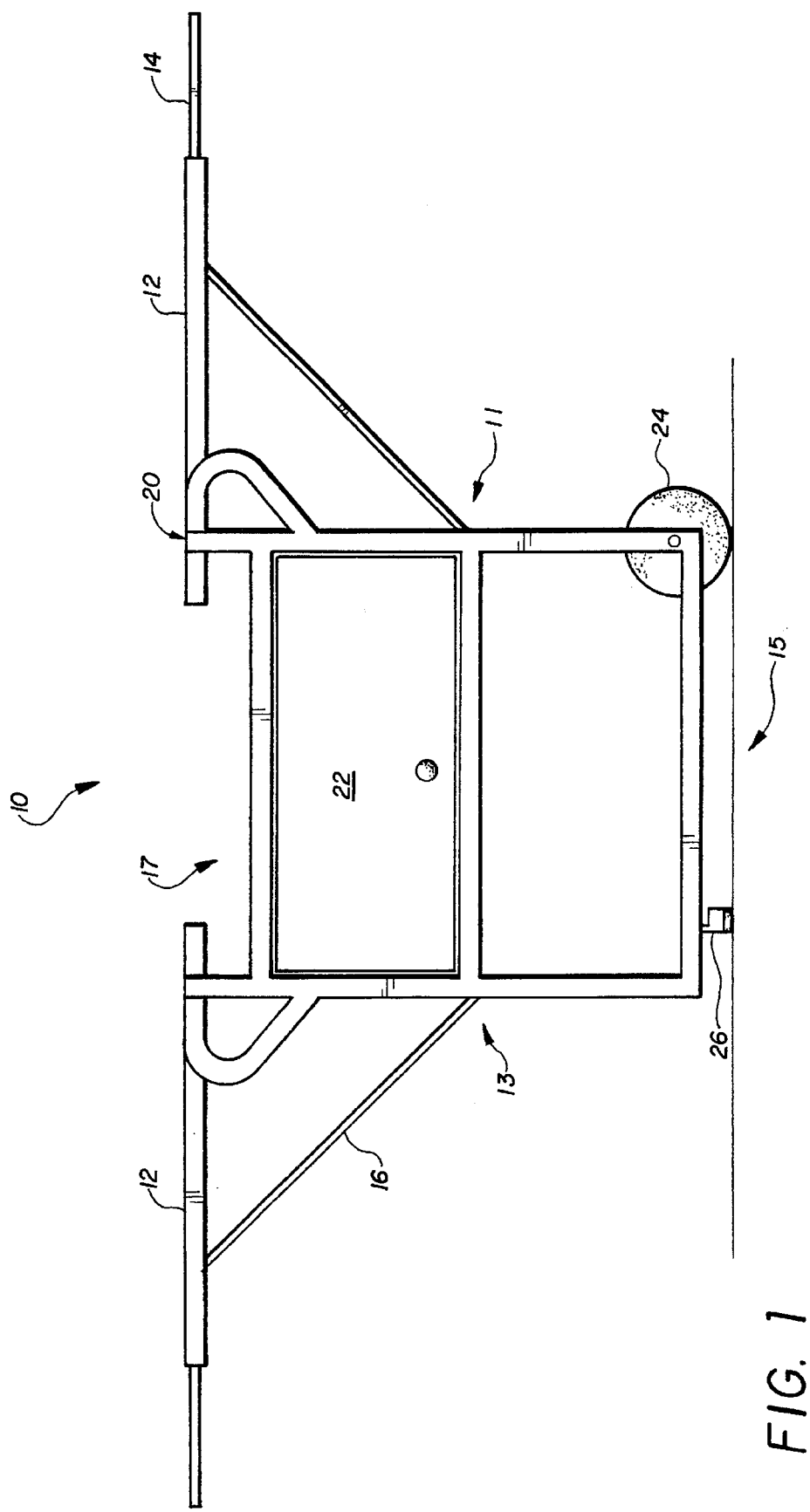
FIG. 1 is a front elevational view of the present invention.

Turning now to FIG. 1 of the drawings, the mobile tool cart 10 having a fully machined steel frame structure with a powder coating is shown with sturdy wheels 24 and leveling device 26. The tool cart 10 has wing member 12 with an extendable portion 14. The wing member 12 is supported by brace 16 and provides support for work placed on the tool cart 10. The wing member 12 rotates about a pivot point 20 for safe storage during transport and non-use. The tool cart 10 is equipped with a tool box 22. The tool box 22 is secured to the tool cart 10 by bolts or fasteners (not shown) and is therefore removable or replaceable. The tool box 22 adds to the efficiency of the tool cart 10 by allowing commonly used tools to be stored in a convenient place therefore reducing the likelihood of theft.

The tool cart 10 also has a front face 13, a rear face 11, a top face 17 and a bottom face 15.

Figure 2:
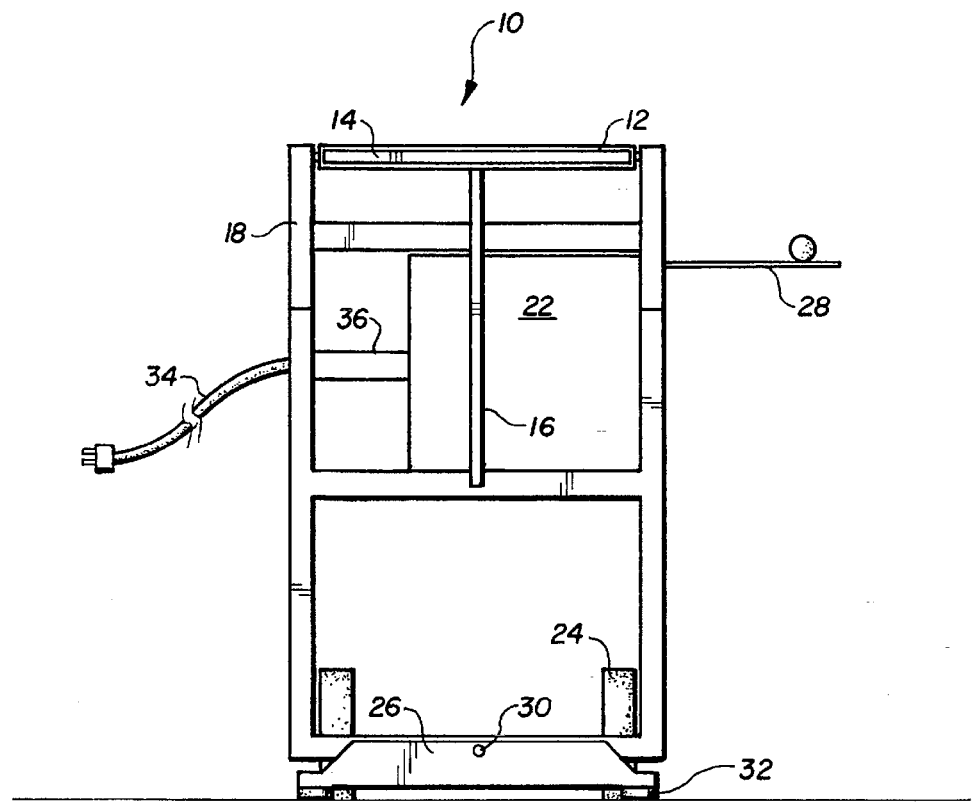
FIG. 2 is a left side elevational view of the present invention.
Figure 3:
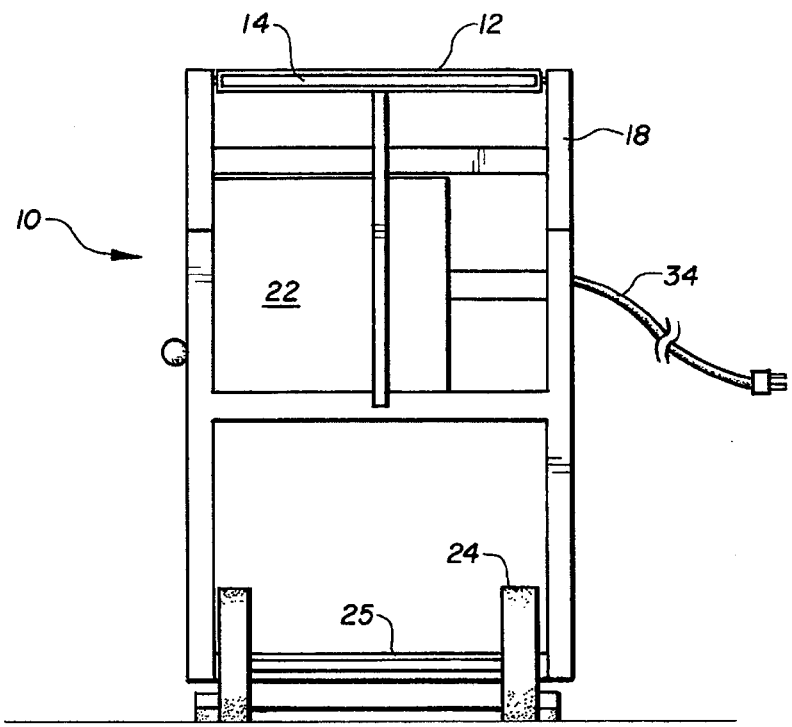
FIG. 3 is a right side elevational view of the present invention.

Turning now to FIGS. 2 and 3 of the drawings, the tool box 22 is shown with the door 28 in the open and closed position respectively. Power cord 34 is connected to the power strip 36. Power strip 36 also acts as a shelf for securing accessories thereto. The power strip 36 can have holes (not shown) for receiving fasteners to secure equipment thereto. The power strip 36 allows the user to plug electrical equipment into the outlets 38 (see FIG. 4). The power strip 36 is secured to the tool box 10 by any appropriate means including welding or bolting. Leveler 26 pivots about pivot point 30 and rests on pads 32. The leveler 26 is designed to adjust or readjust the tool cart 10 to compensate for uneven surfaces. FIG. 3 of the drawings shows wheels 24 having a shaft 25 therebetween. The leveler 26 with pads 32 and the wheels 24 provide support for the tool cart.

Figure 4:
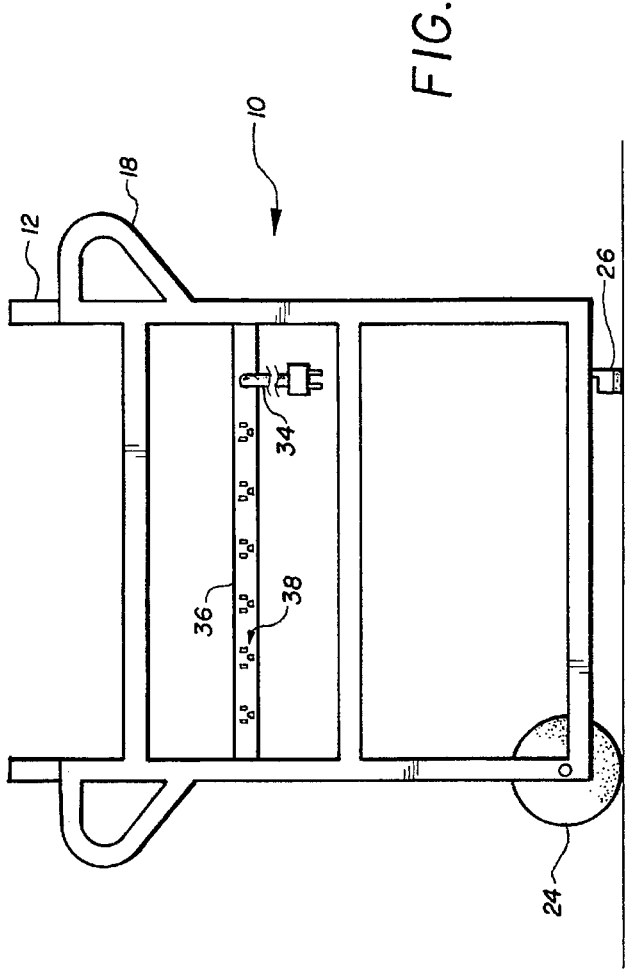
FIG. 4 is a rear elevational view of the present invention.

FIG. 4 of the drawings shows power strip 36 with power outlets 38 and power cord 34. The wing members 12 are shown in the rotated down position. Handles 18 provide assistance in moving or steadying the tool cart 10.

Figure 5:
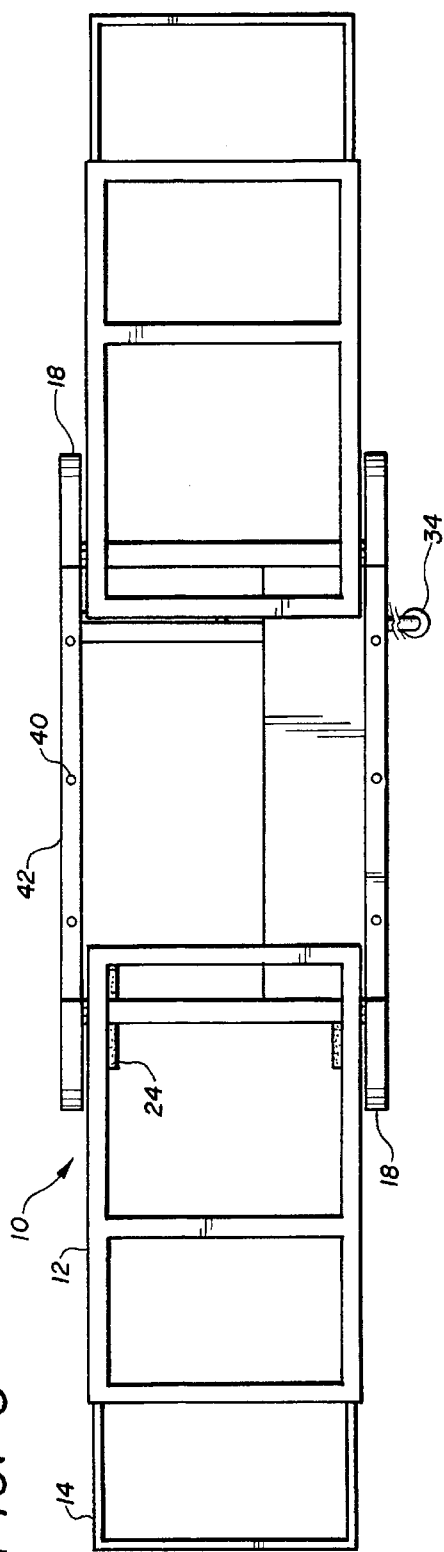
FIG. 5 is a top elevational view of the present invention.
Figure 6:
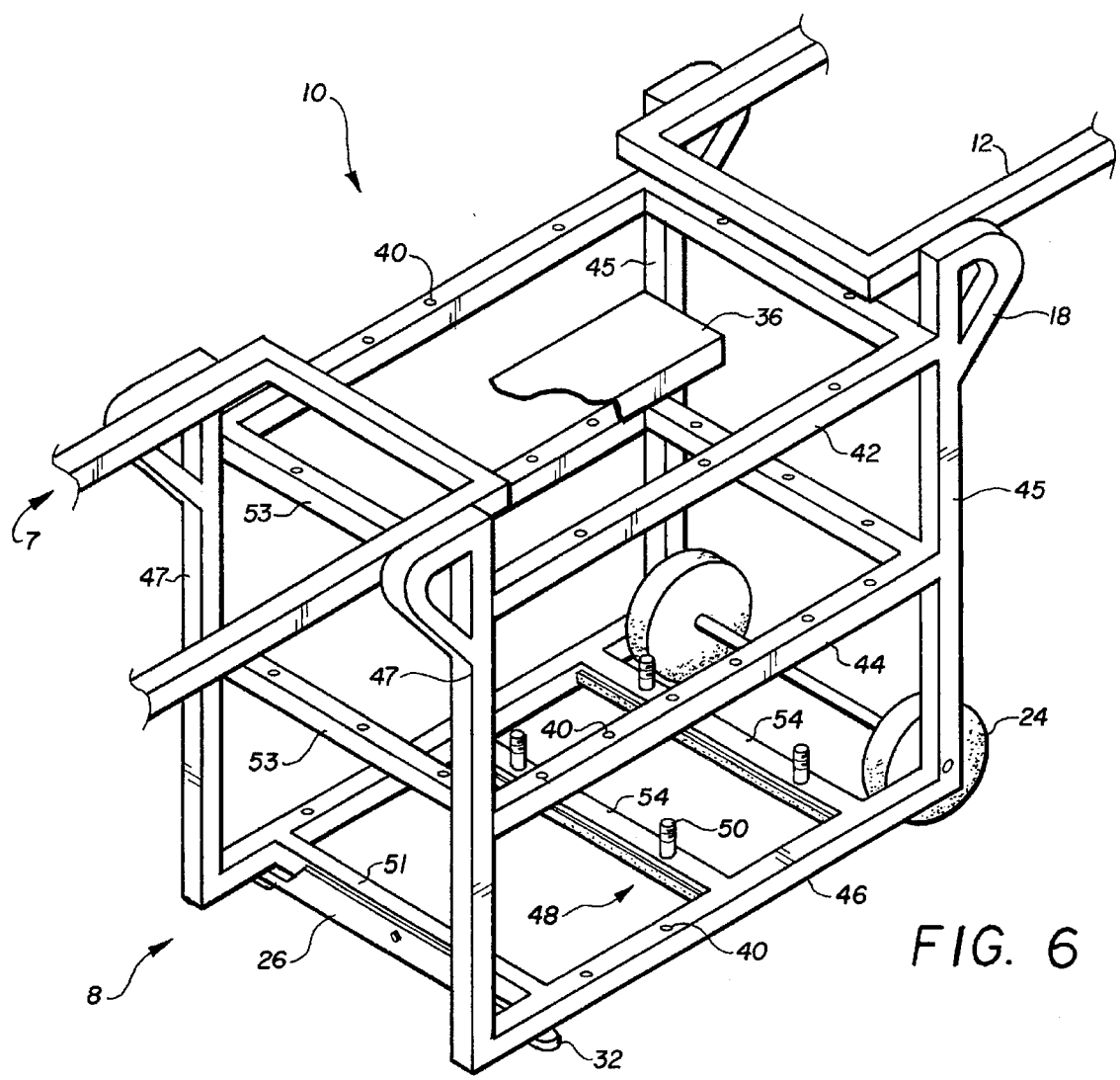
FIG. 6 is a front perspective view of the present invention.

In FIGS. 5 and 6 of the drawings, the wing members 12 are in the up position and wing extension member 14 is in the extended position. Horizontal rails (elements 42, being the top pair of horizontal rails; 44, being the intermediate pair of horizontal rails; and 46 being the base pair of horizontal rails) contain pre-drilled holes 40 dimensioned and configured to receive pre-machined accessories. The pre-drilled holes 40 allow for the easy attachment or detachment of equipment or accessories to the tool cart. For example, to attach a table saw (not shown) to the tool cart, the pre-drilled holes 40 are aligned with the pre-machined holes of the table saw (not shown), and a bolt is driven therebetween and secured. By using the pre-drilled holes 40 the user can customize the tool cart to house a wide number of tools and accessories.

The horizontal rails (42, 44 and 46) extend from a first pair of vertical rails 47 to a second pair of vertical rails 45. The vertical rails 45, 47 have a top end 7 and an opposing base end 8. The vertical rails (45 and 47), horizontal rails (42, 44 and 46) cross braces 51, 53 and cross members 54 comprise the frame structure of the tool cart. Each of the horizontal rails defines a horizontal plane whereas the vertical rails define a vertical plane. Although not shown, the vertical rails 45 and 47 can also have holes which would allow the users to attach equipment or accessories along the vertical rails.

Power strip 36 is attached to vertical rails 45 and 47 between the horizontal planes defined by rails 42 and 44. Cross braces 51 provide support for heavier equipment such as compressors or the like. Vibration dampening device 48 comprises peg or rod 50 disposed on cross brace 51. The vibration dampening device 48 reduces the vibrational effects of certain accessories. Heavy equipment brackets (not shown) will be attached to pegs 50 and rest upon plate 54. The heavy equipment brackets will be used to place the heavy equipment upon. The heavy equipment not placed on their own brackets will be placed on rail 46. Rail 42 has holes 40 arranged to receive accessories such as saws, sanders, drills, dust collecting units and similar devices. All accessories are secured to the rails by bolts or similar attachment devices.

Figure 7:
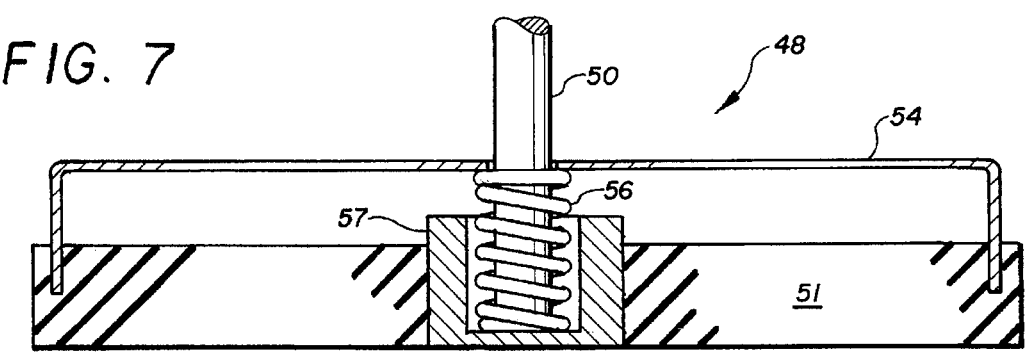
FIG. 7 is an expanded view of the vibration dampening device of the present invention.

Looking now at FIG. 7 of the drawings, the dampening device 48 is shown having peg 50, spring 56, housing 57 and plate 54. A compressor bracket (not shown) attaches to the peg 50. The compressor or similar device then attaches to the bracket. When the compressor generates a vibrational force, the plate 54 carries the force downward onto the spring 56. The spring 56 then compresses therefore dampening the vibrational force and decreasing the amount of vibration in the frame structure.

The accessories that will be attached to the tool cart 10 will be pre-machined to bolt directly onto the tool cart 10. Some of the accessories that will be attached to the tool cart include but are not limited to tool boxes, table saws or the like, fences with measuring rules or scales, table saw brackets, compressor brackets, brackets for electrical connections, dust collectors and brackets, brackets for electrical cord reels, telescoping light stands and flip down wheels to be attached near the leveler 26 end of the tool cart 10.

It is to be understood that the present invention is not limited to the sole embodiment described above, but encompasses any and all embodiments within the scope of the following claims.

I claim:

1. A tool cart comprising:

a first pair of vertical rails and a second opposing pair of vertical rails, said first and second pair of vertical rails having a top end and an opposing base end;

a top pair of horizontal rails extending from said first pair of vertical rails to said second pair of vertical rails proximate said top end;

an intermediate pair of horizontal rails extending from said first pair of vertical rails to said second pair of vertical rails between said top end and said base end;

a base pair of horizontal rails extending from said first pair of vertical rails to said second pair of vertical rails at said base end;

a first cross member extending between said first pair of vertical rails;

a second cross member extending between said second pair of vertical rails, each said cross member and each said pair of horizontal rails having pre-drilled holes for selectively mounting equipment onto the tool cart;

a plurality of cross braces extending between said base pair of horizontal rails;

a first horizontally extendable wing member pivotally connected to said first pair of vertical rails at said top end;

a second horizontally extendable wing member pivotally connected to said second pair of vertical rails at said top end, said first and second wing member being pivotable between a retracted position for storing the tool cart and an extended position for providing a work surface, said first and second wing member each being supported by a brace when in said extended position; and further comprising vibration dampening means for dissipating vibrational forces transmitted by equipment mounted onto the tool cart, said vibration dampening means including:

a housing disposed on one of said plurality of cross braces;

a rod partially contained within said housing;

a spring disposed around said rod; and a plate resting upon said spring and surrounding said rod.

2. The tool cart according to claim 1, further comprising a self-leveling means for automatically leveling the tool cart, said self-leveling means being connected to one of said plurality of cross braces proximate said first pair of vertical rails.

3. The tool cart according to claim 1, further comprising means for supplying electrical power to the equipment, said means for supplying electrical power extending from said first pair of vertical rails to said second pair of vertical rails.

4. The tool cart according to claim 3, wherein said means for supplying electrical power includes an electrical power strip, said electrical power strip having a plurality of outlets therein and an electrical power cord extending therefrom, said electrical power strip being dimensioned and configured as a load bearing surface and thereby acting as a shelf for placement of the equipment.

5. The tool cart according to claim 1, further comprising:

a first handle attached to said first pair of vertical rails proximate said top end;

a second handle attached to said second pair of vertical rails proximate said top end; and a pair of wheels rotatably supported by a shaft affixed to said second pair of vertical rails at said base end.

\* \* \* \* \*